Sept. 5, 1961 B. COOPER ET AL 2,998,761
CAMERA
Filed March 20, 1957 7 Sheets-Sheet 1

INVENTORS.
BENJAMIN COOPER
ALBERT F. HOHMANN
BY
J.B. Felshin
ATTORNEY.

Sept. 5, 1961  B. COOPER ET AL  2,998,761
CAMERA
Filed March 20, 1957  7 Sheets-Sheet 2

INVENTORS.
BENJAMIN COOPER
ALBERT F. HOHMANN
BY
J.B. Felshin
ATTORNEY.

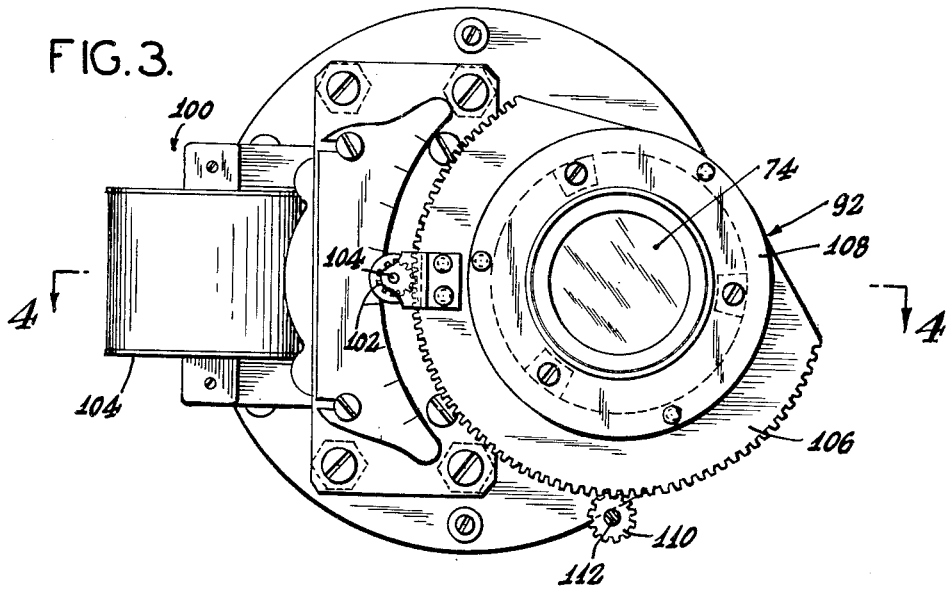
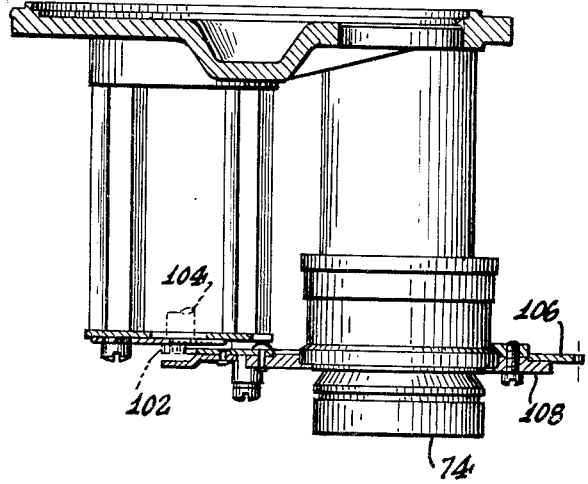
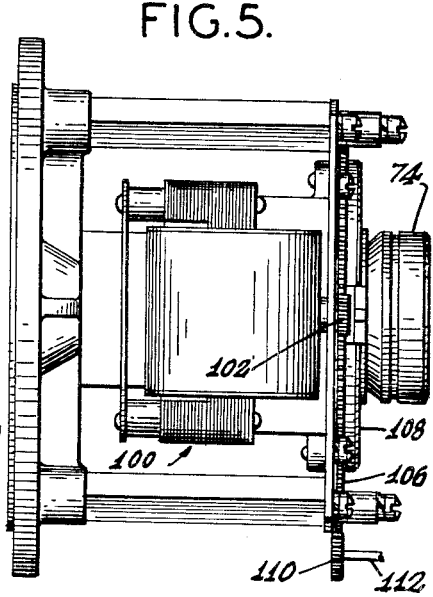

Sept. 5, 1961 B. COOPER ET AL 2,998,761
CAMERA
Filed March 20, 1957 7 Sheets-Sheet 4

INVENTORS,
BENJAMIN COOPER
ALBERT F. HOHMANN
BY
J. B. Felshin
ATTORNEY.

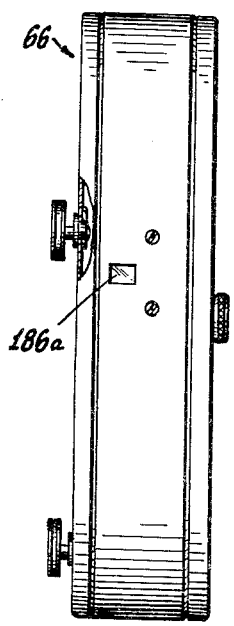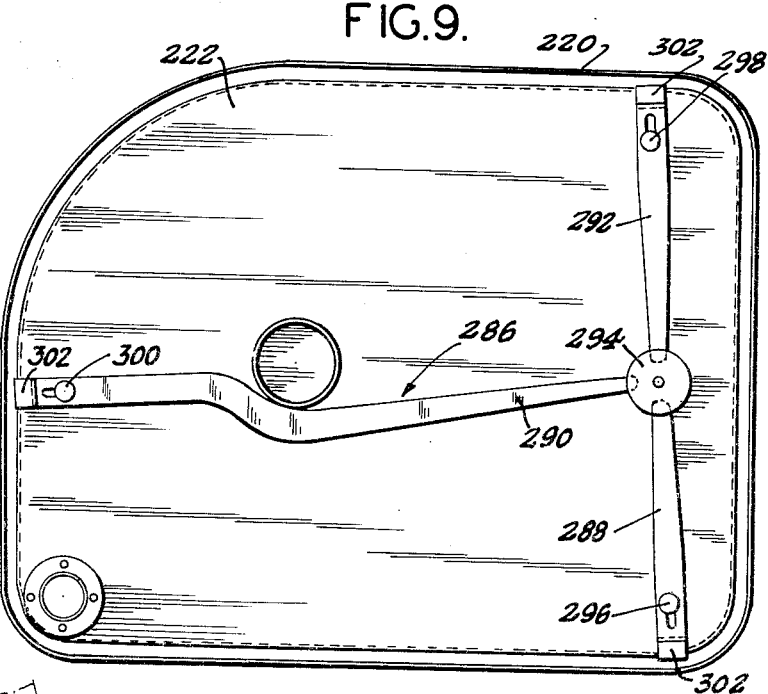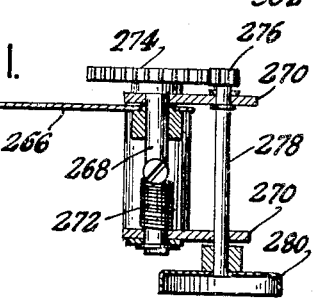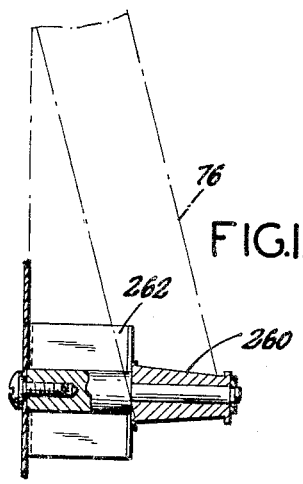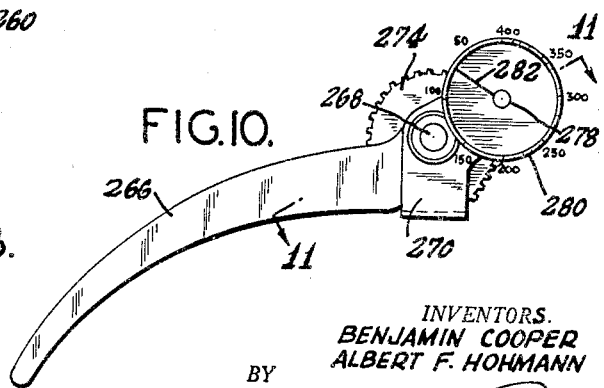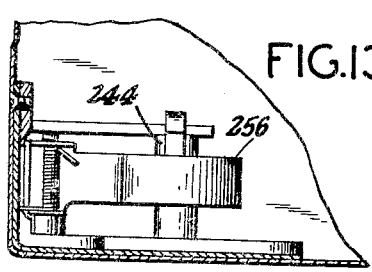

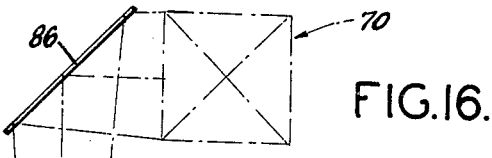
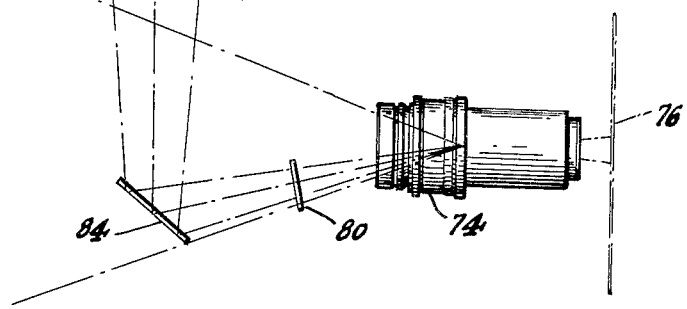
FIG.16.
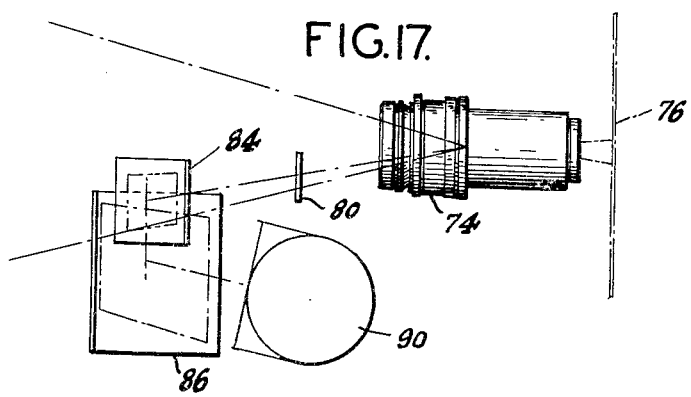
FIG.17.
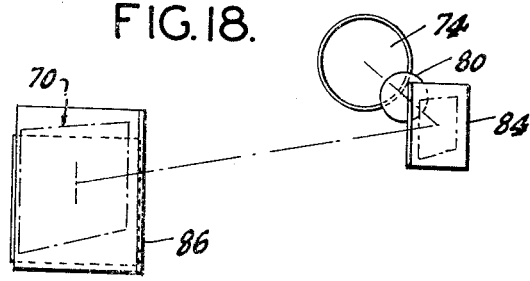
FIG.18.
INVENTORS.
BENJAMIN COOPER
BY  ALBERT F. HOHMANN
ATTORNEY.

INVENTORS.
BENJAMIN COOPER
ALBERT F. HOHMANN

BY

J. B. Felshin

ATTORNEY.

United States Patent Office 2,998,761
Patented Sept. 5, 1961

2,998,761
CAMERA
Benjamin Cooper and Albert Hohmann, Brooklyn, N.Y., assignors, by direct and mesne assignments, to American Electronics, Inc., Los Angeles, Calif., a corporation of California
Filed Mar. 20, 1957, Ser. No. 647,328
7 Claims. (Cl. 95—1.1)

This invention relates to photographic recording devices and in particular to a novel camera having remotely controlled operating means.

The present invention is particularly adaptable for toll checking operations of the type wherein it is desired to record an image of a vehicle passing a predetermined location with such clarity that the vehicle identification, such as the license plate, is readily discernible. It is further desired that the camera be operated by means controlled by the vehicle. Such a system is set forth in applicant's Patent No. 2,736,630 issued February 28, 1956.

The present camera is required to photograph vehicle images during daylight and nighttime hours and also must record a usable image in all types of inclement weather; therefore, there has been provided an automatic iris control mechanism which responds to the quantity of light available and controls the lens aperture accordingly.

One of the principal objects of the invention resides in the provision of a camera having novel means remotely operable to actuate the camera to record an object on the film contained therein.

Another object of the invention is to provide a novel iris control mechanism that responds automatically to the light conditions in the optical field of the camera.

Another object of the invention resides in the provision of a novel lens system having means to concurrently record on a common film plural objects, one of said objects being the actuating vehicle and the other of said objects being data incident to the actuating vehicle.

Still another object is to provide means for proportionately controlling the light on one object automatically in accordance with the light on the other object.

Yet another object resides in the provision of a novel cartridge for the film utilized in the camera.

It is another object of this invention to provide a camera which is simple in operation, tamperproof and weatherproof, i.e., a camera which is contained within a housing which will prevent intentional or unintentional disruption of operation.

Other ancillary objects will be, in part, hereinafter pointed out and will be, in part, hereinafter apparent.

In the drawings:

FIGURE 3 is a front elevation of the lens iris aperture adjusting mechanism.

FIGURE 4 is a cross sectional view of the lens iris aperture adjusting mechanism with the motor deleted, taken along line 4—4 of FIGURE 3.

FIGURE 5 is a side elevation of the lens iris aperture adjusting mechanism.

FIGURE 8 is a front elevation of the film cartridge.

FIGURE 9 is a side elevation of the film cartridge illustrating the cartridge securing means.

FIGURE 10 is a detail side elevation of the film footage indicator.

FIGURE 11 is a cross section taken along line 11—11 of FIGURE 10.

FIGURE 12 is a fragmentary detail of a film transposing guide roller.

FIGURE 13 is a fragmentary detail of the film sprocket pressure lever as viewed from the bottom thereof.

FIGURE 16 is a schematic optical diagram of the auxiliary lens recording system in plan view for jointly recording data incident to the collection of tolls along with the image of the vehicle actuating the camera.

FIGURE 17 is a side elevation of the auxiliary lens system illustrated in FIGURE 16.

FIGURE 18 is a fragmentary front elevation illustrating the specific location of the elements of the lens system.

Figure 1:
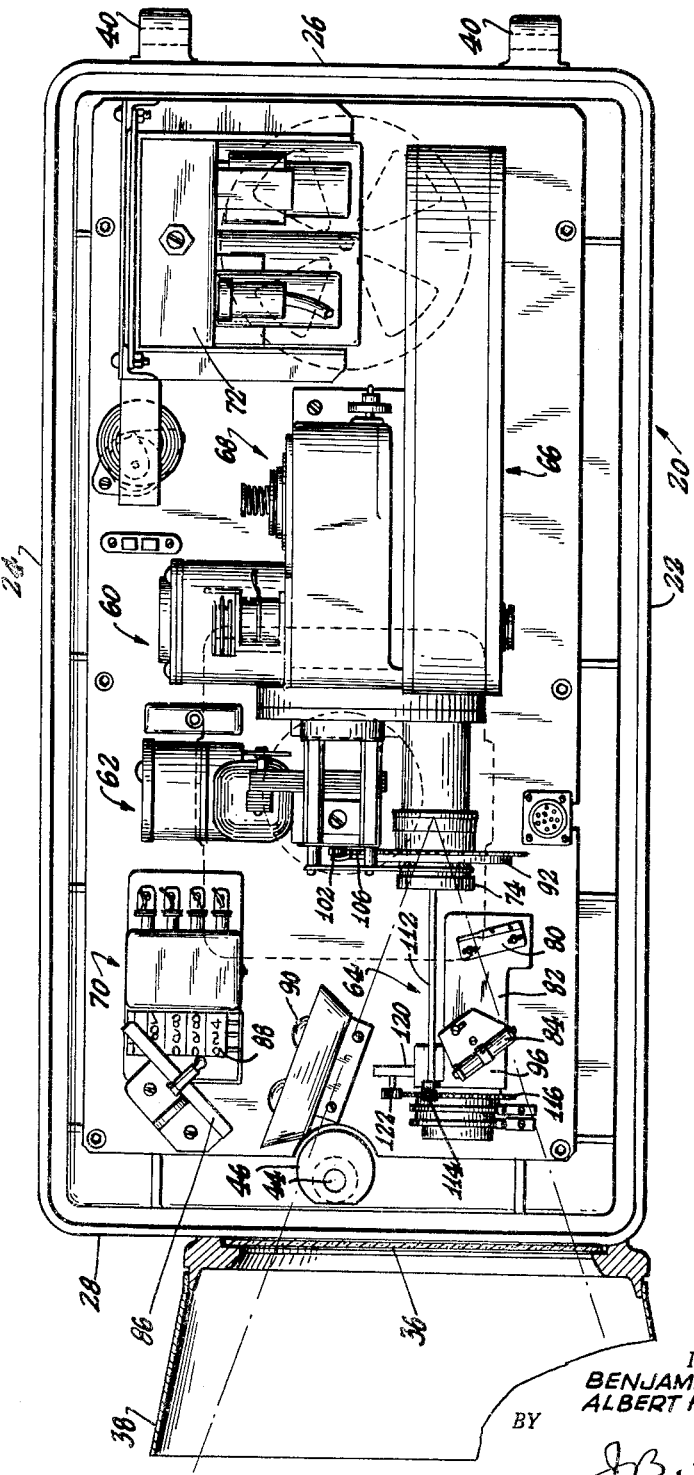
FIGURE 1 is a plan view of the camera with the upper portion of the case removed to further illustrate the internal components.

Referring to the drawings in detail, 20 generally designates the camera container having sidewalls 22, 24 and rear wall 26 and an apertured front wall 28. The respective walls are mounted on a base 30 which is in turn secured to a post 32 which elevates the camera to its proper operating plane. Mounted on top of the respective sidewalls is a top plate 34 disposed in spaced relation at the margins thereof from the respective walls to permit ventilation of the internal cavity formed by the case 20. Affixed to the front wall 28, in sealed relation, is a window 36 which is further provided with an external shade 38 therearound. Window 36 is provided to permit the recording of photographic objects therethrough. The base 30 is provided with a pair of hinges 40 at the rear thereof which are secured to the rear wall 26 so that the respective walls and the top may be pivotally moved to expose the internal components of the camera. A latch mechanism 42 is provided to secure the upper section of the case to the base 30. A lock, not shown, may be utilized with the latch 42 to prevent access by unauthorized persons to the internal components. Latch 42 comprises a rotatable member 44 having a cam 46 which overlies a ledge 48 secured to the front wall 28. Rotation of the member 44 by means of the arm 50 rotates the cam 46 out of engagement with the ledge 48 thereby permitting manual pivoting of the case on the hinges.

Disposed within the case 20 is a camera generally designated as 60 which comprises an automatic iris mechanism 62, a lens system 64, a film container 66 and a film drive mechanism 68. Further, there is provided an indicating counter 70 hereinafter described in detail, which is remotely controlled by extraneous means, not shown herein. The electric control panel is designated as 72 and is provided for a purpose hereinafter appearing.

Figure 2:
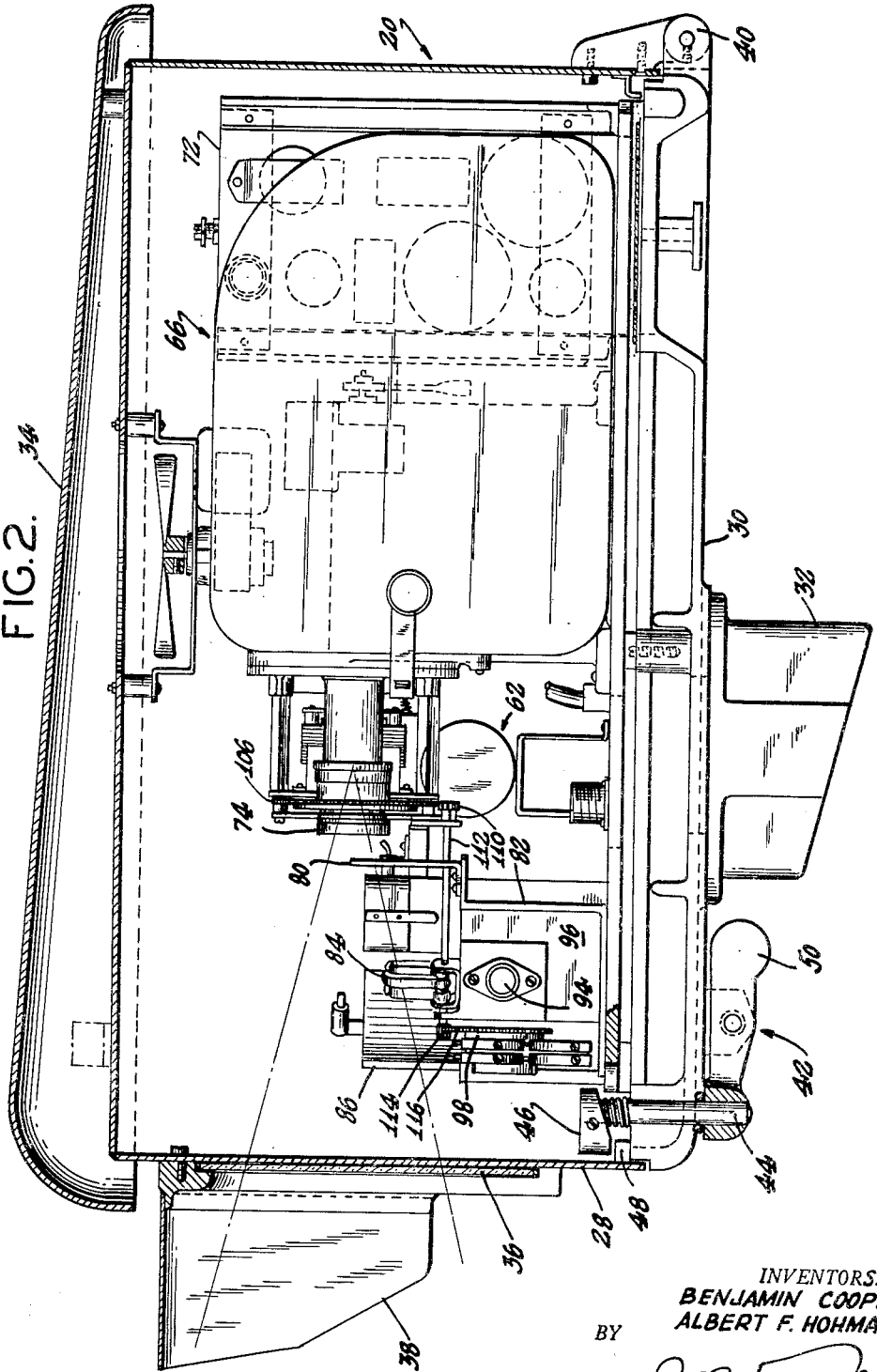
FIGURE 2 is a side elevation of the camera taken in partial cross section to facilitate illustration of the internal components thereof.
Figure 6:
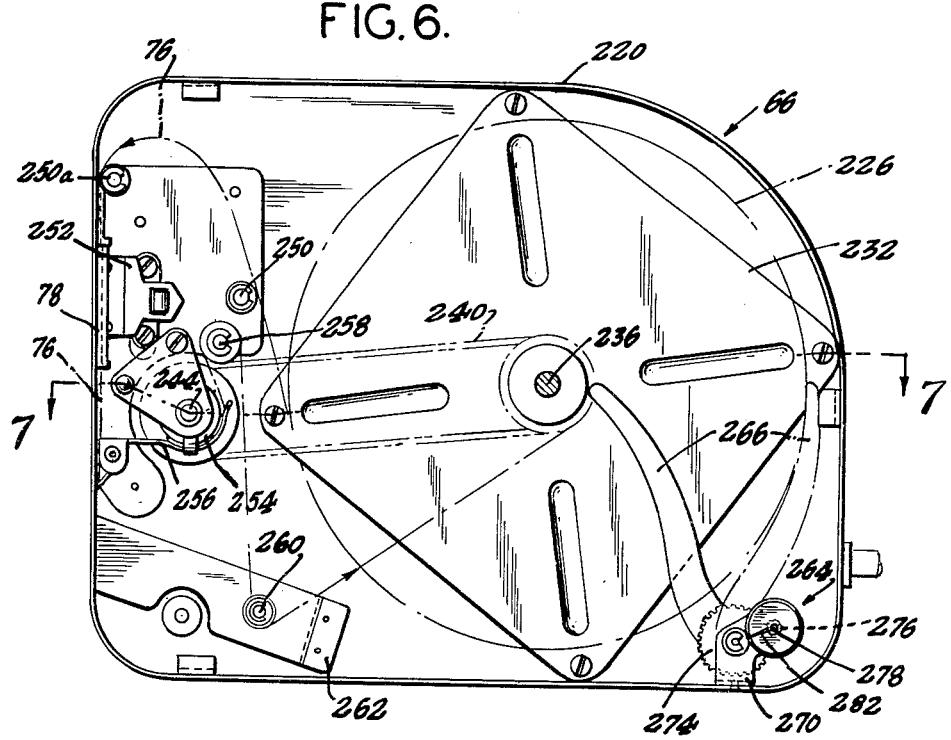
FIGURE 6 is a side elevation of the film cartridge with one side thereof removed to illustrate the internal components.

Essentially, the lens system comprises a primary lens 74 which has a focal length that registers in a conventional manner an image on the film 76 in the film container 66. Referring to FIGURE 6, the film 76 is guided by means hereinafter described past a window 78 provided in the case of the container 66. The frame of film disposed in the window 78 is adapted to receive thereon a latent image of the pictorial representation observed by the objective field of the lens 74. As shown in FIGURES 1 and 2, there is provided a supplementary lens system designated as 80, which comprises a lens element which is mounted on a supporting frame 82 and which is disposed in angular offset relation to the optical axis of the lens 74. However, the supplementary lens 80 is disposed within the optical field of the lens 74. Also secured to the supporting mount 82 is an optical mirror 84 which is arranged to reflect images that have been reflected by a further mirror 86 that is angularly disposed in reflecting relation of counter wheels designated as 88 of the counter assembly 70. A source of light designated as 90 is provided to illuminate the counter wheels 88 so that they may be reflected by the optical mirrors 86 and 84. The lens 80 changes the focal length of the lens 74 so that the image of the counter wheels reflected in the mirror 84 is clearly reproduced on the film 76 in proper focus. This feature is clearly illustrated in FIGURES 16, 17 and 18 wherein diagrammatic angular disposition of the various elements are shown. It will be noted therefrom that the main optical field of the lens 74 is unobstructed except for the minor portion occupied by the auxiliary or supplementary lens 80.

It is well known in the camera art that the lens 74 is preset to record in the optical field thereof images in clearly defined focus a predetermined distance therefrom. In the present instance the vehicle, not shown, actuates a treadle switch, not shown, to actuate the camera to record a picture of the vehicle. This system is disclosed in Patent No 2,736,630, issued February 28, 1956. It is further well known in the photographic art that the amount of light entering the lens 74 must be regulated in order that the film 76 may have a proper exposure thereon. In conventional cameras, an iris is provided which may be rotated to increase or decrease the relative diameter of the lens 74. It is well known that the physical diameter cannot be altered; however, a variance of the effective optical diameter of the lens may be accomplished through an iris diaphragm and the amount of light passing through said lens may be accurately predetermined. In the present instance, the iris 92 is disposed behind the lens 74 and regulates the amount of exposure light that reaches the film 76.

Means are provided to automatically control the iris 92 in accordance with the amount of light that is present on the object which is to be photographed and directed toward this end there is provided a photocell 94 (FIG. 2) that is disposed within a housing 96 affixed to the lens mounting 82. Photocell 94 is disposed behind an iris 98 which is similar to the iris 92; photocell 94 controls means hereinafter described which automatically presets both the iris 92 and the iris 98 in accordance with the light that enters the window 36 of the case 20. As shown in FIGURE 3, there is provided an electronic motor 100 having a reduction gearing, not shown, which reduces the speed of a drive shaft 102. Further, motor 100 is of the reversible type having a pair of coils generally designated as 104 and each of which controls direction of movement of the shaft 102. Affixed to shaft 102 is a pinion 105 which meshes with a gear 106 that is in turn affixed to a flange 108 of the iris 92. Thus, rotation of shaft 102 in one direction will rotate gear 106 in the opposite direction to vary the size of the aperture formed by the iris 92. Analogously rotation of the shaft 102 in the opposite direction will complementary vary the size of the aperture formed by the iris 92. Concurrently with the changing of the size of the aperture in iris 92, the iris 98 is likewise controlled, i.e., iris 92 and iris 98 are adapted to concurrently open and close under the control of motor 100. A pinion 110 attached to a shaft 112 is disposed in meshing engagement with the gearing 106 and, accordingly, rotates therewith. Shaft 112 is journalled in suitable bearings and has affixed thereon a pinion 114 which is disposed in meshing engagement with a ring gear 116 (FIG. 2) which is adapted to open or close the iris 98 in accordance with the direction of rotation thereof.

Means hereinafter described controls the direction of motor 100 and the period of energization thereof in such a manner that the quantity of light passing through the iris 98 and falling upon the photocell 94 is directly proportional to the amount of light that is permitted to enter and pass through the primary lens 74.

Further, means are provided to control the amount of illumination emitted by the lamps 90 so that the light reflected by the mirrors 86 and 82 is proportional to the light passing through the window 36. Directed toward this end there is provided a rheostat 120 (FIG. 1) which is controlled by a pinion 122 that is disposed in meshing engagement with the gearing 116 and, accordingly, rheostat 120 is included in the circuit for controlling lamps 90 to increase or decrease the voltage thereto and, accordingly, vary the light intensity emitted thereby. With the speed of the shutter predetermined and the relative speed of the film being utilized predetermined, then a proportional variance of the iris 92 assures the recording of a properly exposed image on the film 76.

Figure 19:
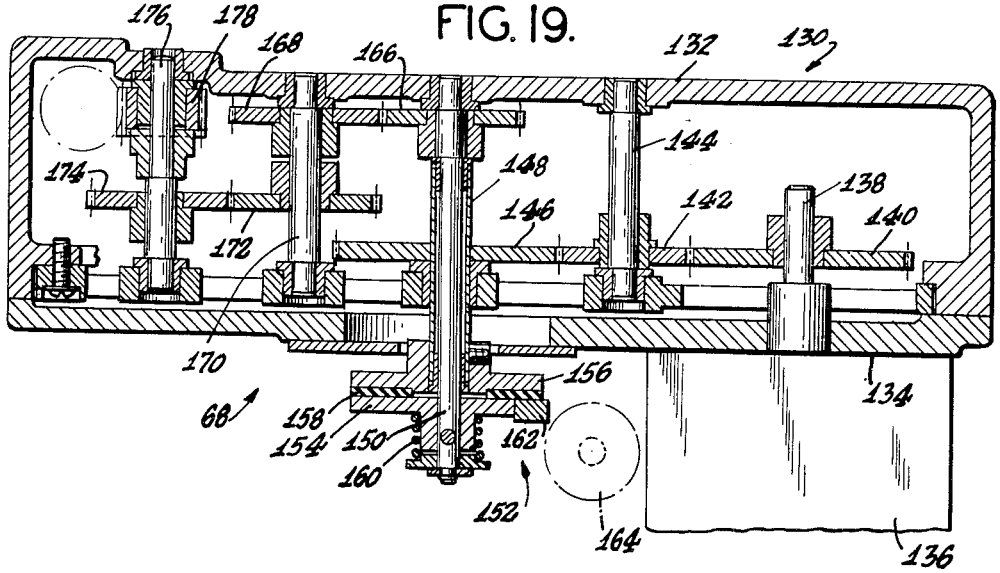
FIGURE 19 is a cross sectional view taken through the film drive mechanism illustrating the drive gear train.

Means are provided to supply a new frame of film to the window 78 of the film container 66 upon each actuation of the shutter and directed toward this end there is provided the shutter actuating mechanism generally designated as 68 (FIG. 19).

Figure 20:
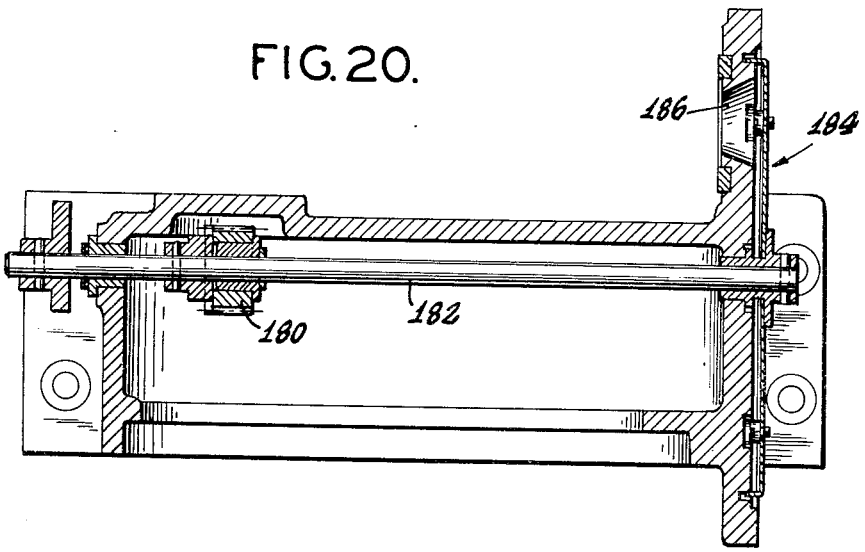
FIGURE 20 is a cross sectional view of the shutter operating mechanism.
Figure 21:
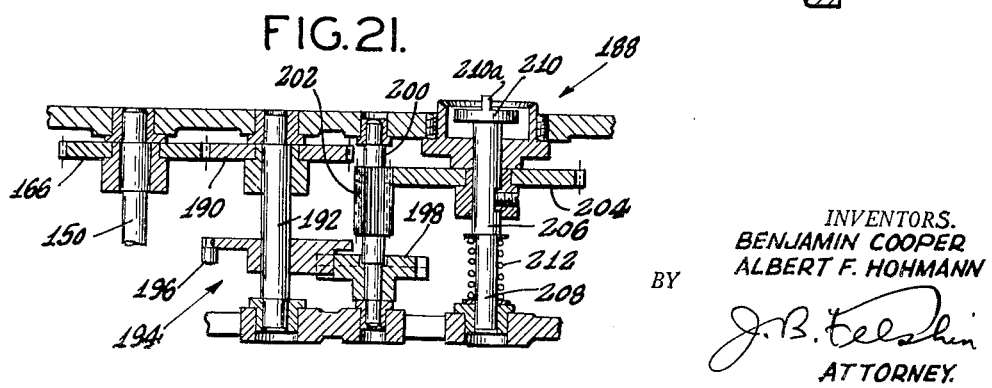
FIGURE 21 is a cross section detail of the coupling mechanism intermediate the film drive mechanism and film cartridge.

As shown in FIGURES 19, 20 and 21, a gear box mechanism comprising a housing 130 formed of two sections, 132 and 134 respectively, having a plurality of shafts therein. Affixed to the outer surface of section 134 is a motor 136 having a shaft 138 which extends therethrough and affixed to the shaft and rotatable therewith is a pinion 140. Pinion 140 is disposed in meshing engagement with a pinion 142 which is affixed to an idler shaft 144 journalled in the housing 130. Pinion 142 is further disposed in meshing engagement with a pinion 146, which is affixed to and rotatable with a sleeve 148 which is circumjacently disposed on a shaft 150. Shaft 150 is coupled to the sleeve 148 by means of a friction clutch 152 which comprises a driven plate 154 and a driving plate 156. Disposed intermediate the plates 154 and 156 is a cork gasket 158. A spring 160 is adapted to urge the plates 154 and 156 into engagement with the power transmitting gasket 158. A latch dog 162 is provided on the plate 154 and is controlled by a solenoid 164 to provide a one revolution operation, as will be hereinafter apparent.

It will be assumed that the motor 136 must be continuously operating and, accordingly, the aforesaid power drive effects a continuous rotation of the clutch section 156. The solenoid 164, by engaging the dog 162, prevents the clutch section 154 from rotating and only when said solenoid is actuated does the shaft 150 rotate. Rotation of shaft 150 effects the rotation of a pinion 166 affixed thereto which is disposed in meshing engagement to a pinion 168 which is affixed to an idler shaft 170. Shaft 170 has further attached thereto a pinion 172 which is disposed in meshing engagement with a pinion 174. Pinion 174 is affixed to a shaft 176 and also affixed to said shaft is a worm gear 178. Worm gear 178 is disposed in meshing engagement with a worm 180 that is secured to a shaft 182. Shaft 182, mounted transversely in the housing 130, actuates the shutter 184. The shutter 184 is of the rotary plate type having an aperture therein which is adapted to rotate past a window 186 and permit a predetermined exposure of the film hereinafter described, which is disposed behind the window 186.

In operating the shutter, the motor 136 drives the gear train through the clutch 152 to effect a single rotation of the shaft 182 and thus similarly actuate shutter 184.

Concurrently with the actuation of shutter 184, a film drive mechanism 188, FIGURE 21, is actuated to advance the film in the film container 66, a single frame. Film drive mechanism 188 generally comprises a pinion 190, which is affixed to a shaft 192 and which is disposed in meshing engagement with the pinion 166 on the shaft 150. It will be noted that shaft 150 is the driven shaft of the clutch mechanism 152. Shaft 192 actuates a Geneva movement generally designated as 194, which consists of a Geneva gear 196 which intermittently engages a pinion 198 affixed to a shaft 200 and, accordingly, rotates said shaft in incremental movement. Shaft 200 further has affixed thereto a gear 202 which is disposed in meshing engagement with a pinion 204 that is affixed to a sleeve 206 that is circumjacently disposed on a shaft 208. Sleeve 206 has affixed to one end thereof a coupling 210 which is adapted to engage means, hereinafter described, to actuate the film drive mechanism in the film cartridge 66, as will be hereinafter apparent. Sleeve 206 is spring urged by means of a coiled spring 212 circumjacently disposed on a portion of shaft 208, coaxially along said shaft. The limited axial movement of the sleeve 206 and the coupling 210 thereon permits the axial displacement of said sleeve against the tension of the spring 212 when the film cartridge is disposed in a misaligned relationship, such as might occur upon the initial positioning of the cartridge in the camera. The coupling 210 has a raised central portion 210a which is adapted to reside in a complemental slot 214a in the cartridge coupling 214. Upon insertion of the film cartridge in the camera wherein the coupling 210 does not align with the cartridge coupling 214, a test advancement of the film will bring the coupling 210 into alignment with the coupling 214, at which time spring 212 will urge coupling portion 210a into the slot 214a of coupling 214. Thus, the drive mechanism is connected to the film supply in the cartridge 66.

Figure 7:
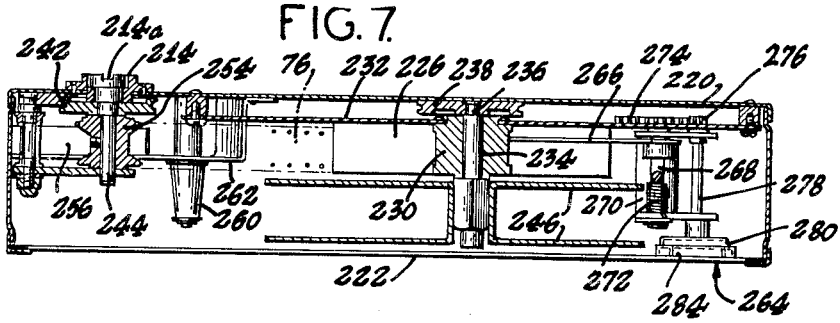
FIGURE 7 is a cross section taken along line 7—7 of FIGURE 6.
Figure 14:
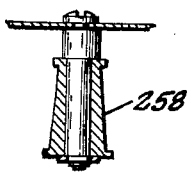
FIGURE 14 is a fragmentary section detail of another film transposing guide roller.
Figure 15:
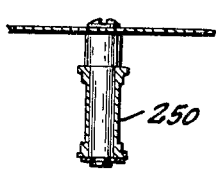
FIGURE 15 is a fragmentary sectional elevation of the film spool mounting hub.

As shown in FIGURES 6 and 7, the cartridge 66 generally comprises a light tight casing 220 having a removable cover 222 which permits access to the film 76 therein. The fresh unexposed film 76 is stored on a supply spool 226, which is journalled on a hub 230 which is affixed to a bracket 232 secured to the casing 220 in spaced relation. Hub 230 is provided with a through bore 234 in which a shaft 236 is journalled. Shaft 236 has affixed thereto a pulley 238 for a purpose hereinafter appearing. The pulley 238 is disposed intermediate the bracket 232 and the fixed side wall of the casing 220. An endless belt 240 is adapted to be disposed on the periphery of the pulley 238 and around the periphery of the pulley 242 which is affixed to a shaft 244 that is in turn secured to the coupling section 214a. Thus, rotation of the coupling 214 in effect rotates pulley 238 and shaft 236 secured thereto. Also secured to the shaft 236 on the portion that extends beyond the supply spool 226 is a take-up spool 246 which is adapted to rotate therewith. As will be hereinafter pointed out, the film 76 is taken from the supply spool 226 and returned to the take-up spool 246 after said film has been exposed. The film path may be traced as follows: The film 76 is taken from the supply spool 226 in such a manner that said spool rotates clockwise, as viewed in FIGURE 6. The film is then passed around a path of spaced guide rollers 250 and 250a which are disposed in the same plane as the plane of the supply spool 226. The film 78 is fed through a gate 252 which is disposed adjacent to the window 186a to repetitively expose a single frame of film to said window. The film continues around a sprocket 254 which is also driven by the shaft 244 affixed to coupling 214. A pressure guide plate 256 is pivotally mounted and spring urged to maintain the engagement of the drive apertures in the film with the sprocket teeth on the sprocket 254. The film continues around an idler guide roller 258 which differs from the guide rollers 250 in that guide roller 258 has a tapered periphery and, accordingly, the film upon leaving said guide roller is offset tangentially from the transverse axial plane of said roller. A second guide roller 260 mounted on a bracket 262 affixed to the casing 220 is adapted to receive the film around a portion of the periphery thereof. The guide roller 260 is also tapered but, however, the taper is offset to the taper of the guide roller 258. The film is then fed onto the take-up spool 246. It will be noted that the plane formed by the transverse axis through the guide roller 260 aligns with a plane that is formed through the transverse axis of the take-up spool 246 and, accordingly, the film is readily fed thereon. The opposing tapers of the guide rollers 258 and 260 permits the offset tangential feed of film in a continuous uninterrupted manner.

Means are provided to indicate the amount of film that remains unexposed on a supply spool 226 and directed toward this end there is provided an indicator assembly 264. Indicator assembly 264 generally comprises a follower arm 266 which is affixed to a shaft 268 journalled in a U-bracket 270. Shaft 268 has circumjacently disposed therearound a torsion spring 272 which is anchored at one end to the shaft 268 and at its opposite end to the bracket 270. The tension of spring 272 is such as to urge arm 266 into engagement with the film 76 on the supply spool 226. Also affixed to shaft 268 is a gear 274 which is disposed in meshing engagement with a pinion 276 that is affixed to a parallel shaft 278 which is journalled in the bracket 270. Shaft 278 extends through a cup 280 and is provided with an indicating pointer 282. A flange 284 protruding inwardly from the removable section 222 of the film cartridge is adapted to reside within the cup 280 and a window disposed within the area of said flange permits a visual inspection of the pointer 282. The gearing ratio between gear 274 and pinion 276 is proportional to the footage of the film that is disposed on the supply spool 226.

The exterior of the removable section 222 is provided with a latching mechanism 286 which substantially secures said removable section to the casing 220. The latching mechanism 286 generally comprises a plurality of angularly extending levers 288, 290 and 292 which are pivotally secured at one end to a rotary cam 294 and which are slideably secured to studs 296, 298 and 300 respectively. Suitable slots are provided in the respective levers and the studs pass therethrough. Cooperating latches 302 are mounted in a secure manner to the casing 220 and are adapted to receive the respective levers therein.

Thus, it will be obvious that a partial rotation of the rotary member 294 will move the respective levers out of engagement with the latches 302 thereby permitting removal of the cover section 222 of the film cartridge.

Thus, it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the invention, except as limited by the claims.

The invention claimed is:

1. In combination a camera having primary lens means including light controlling iris means, shutter means, film drive means, and means for concurrently actuating said film drive means and shutter means to exposed riven film with an image focused thereon by said primary lens means, indicia means adjacent said camera, means including an auxiliary lens means prefocused to superimpose an image of said indicia means, on the image formed by said primary lens means on the driven film, and photoelectric means to control said iris means in accordance with the intensity of light on the object forming the image formed by said primary lens means, electric means to illuminate said indicia means, and means controlled by said photoelectric means, to control said illuminating means.

2. In a camera having a housing and including a primary optical lens system for focusing an image of an object disposed externally of the camera on film disposed within the camera, a film container, a shutter, a means for actuating the shutter to expose the film, and advancing the film in the container past such shutter, the combination thereof with indicia means adjacent the camera, a secondary optical lens system adapted to project an indicia image on the film concurrently with the exposure thereof to the external object, the indicia object forming the indicia image being disposed internally within said camera housing, electric lamp means to illuminate said indicia means, means to vary the light values passing through the primary lens system, and means controlled by said varying means, to control the illuminating means.

3. In a camera having a substantially opaque housing and including a transparent window portion, and located in said housing, a primary lens system, disposed in optical alignment with said window portion and including an iris mechanism, a shutter, a film container, means for actuating said shutter and a film advancing mechanism to expose film in said film container with an image formed by the primary lens system, means for controlling the iris mechanism automatically in accordance with the value of light falling on the object being photographed by said primary lens system, indicia means disposed within said housing, electric means to illuminate said indicia means, means controlled by said iris controlling mechanism and controlling said illuminating means, to vary the amount of illumination on said indicia means in a direct relationship to the value of light on the object being recorded by said primary lens system, and a secondary lens system for superimposing an image of the indicia means on a portion of the film concurrently with the recording of the object image.

4. In a camera having an optical means, a shutter mechanism, a film container, and means for actuating the shutter mechanism and advancing the film in a film container to expose the film to images focused thereon by said optical means, the combination thereof with an iris mechanism disposed intermediate the optical means and the shutter mechanism, means for varying the aperture of said iris mechanism, a light sensitive means, and light controlled means for automatically controlling said iris varying means in a predetermined relationship with the light value on said light sensitive means, an object, a secondary optical means adapted to focus the image of said object in optical registration with the first optical means, electric lamp means for illuminating the object focused by said secondary optical means, and means controlled by said light controlled means for varying the illuminating means in a similar predetermined relationship with the light value on said light sensitive means.

5. In combination, a camera having a primary lens means to form an image of an object to be photographed on film in the camera, an indicia means, an auxiliary lens system to superimpose on the film an image of the indicia means, on the image of the object to be photographed, electric means to illuminate said indicia means, an iris means controlling light passing through said primary lens means, a second iris means to receive light from the object to be photographed and connected to the first iris means for operation therewith, photoelectric means controlled by light from the second iris means, means controlled by said photoelectric means to control operation of said first and second iris means, and means controlled by said second iris means to control said illuminating means.

6. In combination, a housing having a window, a camera within said housing and having a primary lens means directed toward the window, to form an image of an object in front of the window on film in the camera, an indicia means in the housing, means including an auxiliary lens means to superimpose an image of the indicia means on the image formed by the primary lens on the film, electric means to illuminate the indicia means, an iris means controlling the light passing through said primary lens means, an iris means receiving light passing through the window and operatively connected to the first iris means, for complementary actuation therewith, photoelectric means controlled by light passing through said second iris means to control the actuation of said first and second iris means, and means controlled by actuation of said first iris means to control said illuminating means.

7. In combination, a camera having a primary lens means, shutter means therefor, means to drive film past the shutter means, means concurrently actuating said film drive means and shutter means to expose film driven by said drive means with an image focused thereon by said primary lens means, indicia means, means including an auxiliary lens means to superimpose an image of said indicia means on part of the image focused by the primary lens means on the film driven by said film drive means, iris means controlling passage of light through said primary lens means, electric lamp means to illuminate said indicia means, means including photoelectric cell means, to control said iris means, and means controlled by said iris controlling means, to control said illuminating means.

References Cited in the file of this patent

UNITED STATES PATENTS

| | | |
|---|---|---|
| 1,722,935 | Messter | July 30, 1929 |
| 2,125,388 | Monroe | Aug. 2, 1938 |
| 2,210,090 | Lutz et al. | Aug. 6, 1940 |
| 2,227,987 | Tuttle | Jan. 7, 1941 |
| 2,353,154 | Fowler | July 11, 1944 |
| 2,406,152 | Levine | Aug. 20, 1946 |
| 2,421,499 | Guedon | June 3, 1947 |
| 2,518,717 | Rath | Aug. 15, 1950 |
| 2,683,402 | Bruck | July 13, 1954 |
| 2,819,942 | Goodling | Jan. 14, 1958 |
| 2,821,106 | Ranft | Jan. 28, 1958 |
| 2,868,064 | Henkel | Jan. 13, 1959 |